US 9,840,005 B1

(12) United States Patent
Thorne

(10) Patent No.: US 9,840,005 B1
(45) Date of Patent: Dec. 12, 2017

(54) CAM-DRIVEN DIFFERENTIAL JOINT

(71) Applicant: Google Inc., Mountain View, CA (US)

(72) Inventor: Christopher Everett Thorne, Mountain View, CA (US)

(73) Assignee: Google Inc., Mountain View, CA (US)

( * ) Notice: Subject to any disclaimer, the term of this patent is extended or adjusted under 35 U.S.C. 154(b) by 690 days.

(21) Appl. No.: 14/458,371

(22) Filed: Aug. 13, 2014

(51) Int. Cl.
B25J 9/00 (2006.01)
B25J 9/10 (2006.01)
F16H 25/18 (2006.01)
B25J 9/12 (2006.01)

(52) U.S. Cl.
CPC ............ B25J 9/109 (2013.01); B25J 9/123 (2013.01); F16H 25/18 (2013.01)

(58) Field of Classification Search
CPC ............ B25J 9/109; B25J 9/123; F16H 25/18
USPC .... 74/55, 567, 490.05, 490.07; 91/492, 494, 91/499; 92/138, 150; 901/19, 22
See application file for complete search history.

(56) References Cited

U.S. PATENT DOCUMENTS

| 3,592,067 | A | * | 7/1971 | Hetzer | .................. F15B 15/06 74/5 R |
| 4,066,002 | A | * | 1/1978 | Eastman | ................. F01B 1/062 91/36 |
| 4,621,332 | A | * | 11/1986 | Sugimoto | ............. B25J 9/1633 318/568.17 |
| 4,966,067 | A | | 10/1990 | Ames | |
| 8,047,094 | B2 | | 12/2011 | Love | |
| 8,413,540 | B2 | | 4/2013 | Long | |
| 2011/0196509 | A1 | | 8/2011 | Jansen | |

* cited by examiner

Primary Examiner — William C Joyce
(74) Attorney, Agent, or Firm — Honigman Miller Schwartz and Cohn LLP

(57) ABSTRACT

An example robotic joint may include a first cam and a second cam. The robotic joint may also include a first actuator configured to contact the first cam, a second actuator configured to contact the first cam, a third actuator configured to contact the second cam, and a fourth actuator configured to contact the second cam. The robotic joint may also include a first coupling link configured to couple the first cam to a first drive shaft link, and a second coupling link configured to couple the second cam to a second drive shaft link. The robotic joint may also include a drive shaft rigidly coupled to the first drive shaft link and the second drive shaft link, wherein the drive shaft rotates about a first pivot axis when the first and third actuators and the second and fourth actuators act in concert.

19 Claims, 10 Drawing Sheets

CAM-DRIVEN DIFFERENTIAL JOINT

GOVERNMENT RIGHTS

This invention was made with U.S. Government support under Contract No. W91CRB-11-C-0048 awarded by DARPA. The Government may have certain rights with regard to the invention.

BACKGROUND

Unless otherwise indicated herein, the materials described in this section are not prior art to the claims in this application and are not admitted to be prior art by inclusion in this section.

A robotic device includes a mechanical agent, usually an electro-mechanical machine that is guided by a computer program or electronic circuitry. Robots can be autonomous or semi-autonomous and range from humanoid designs, to large industrial designs with jointed arms and end effectors to perform specialized tasks.

Such robotic devices may include several joints configured to enable the robotic device to perform a variety of functions and movements. For example, a humanoid robotic device may include hip joints, ankle joints, and/or wrist joints. In some example operations, such joints of a robotic device may need a relatively large range of motion and consistent transmission ratio in a first degree of freedom to perform desired functions. Such joints may further require operation in a second degree of freedom.

SUMMARY

The present application discloses embodiments that relate to robotic joints for various robotic devices. In one example, the present application describes robotic joint including a first cam and a second cam positioned substantially parallel to the first cam. The robotic joint may also include a first actuator configured to contact a first lobe of the first cam, wherein the first actuator has a first thrusting mode and a first relaxing mode. The robotic joint may also include a second actuator configured to contact a second lobe of the first cam, wherein the second actuator has a second thrusting mode and a second relaxing mode. The robotic joint may also include a third actuator configured to contact a third lobe of the second cam, wherein the third actuator has a third thrusting mode and a third relaxing mode. The robotic joint may also include a fourth actuator configured to contact a fourth lobe of the second cam, wherein the fourth actuator has a fourth thrusting mode and a fourth relaxing mode. The robotic joint may also include a first coupling link configured to couple the first cam to a first drive shaft link, and a second coupling link configured to couple the second cam to a second drive shaft link. The robotic joint may also include a drive shaft rigidly coupled to the first drive shaft link and the second drive shaft link, wherein the drive shaft rotates about a first pivot axis and a second pivot axis such that the first pivot axis is orthogonal to the second pivot axis. Rotation about the first pivot axis occurs when the first and third actuators and the second and fourth actuators act in concert, such that the first actuator is in the first thrusting mode when the third actuator is in the third thrusting mode and the second actuator is in the second thrusting mode when the fourth actuator is in the fourth thrusting mode. Rotation about the second pivot axis occurs when the first and fourth actuators and the second and third actuators act in concert, such that the first actuator is in the first thrusting mode when the fourth actuator is in the fourth thrusting mode and the second actuator is in the second thrusting mode when the third actuator is in the third thrusting mode.

In another aspect, the present application discloses a robotic device. The robotic device may include a body, and one or more joints coupled to the body. The one or more joints may include a first cam and a second cam positioned substantially parallel to the first cam. The one or more joints may also include a first actuator configured to contact a first lobe of the first cam, a second actuator configured to contact a second lobe of the first cam, a third actuator configured to contact a third lobe of the second cam, and a fourth actuator configured to contact a fourth lobe of the second cam. The one or more joints may also include a first coupling link configured to couple the first cam to a first drive shaft link, and a second coupling link configured to couple the second cam to a second drive shaft link. The robotic joint may also include a drive shaft rigidly coupled to the first drive shaft link and the second drive shaft link. The robotic device may also include a load cell provided proximal to a given joint of the one or more joints for detecting a first force applied to the robotic device. The robotic device may also include a controller coupled to the load cell for controlling the given joint to cause the drive shaft to rotate about a first pivot axis in response to the detected first force, such that the first and third actuators and the second and fourth actuators act in concert when the drive shaft rotates about the first pivot axis.

In yet another aspect, the present application another robotic joint, including a first cam and a second cam positioned substantially parallel to the first cam. The robotic joint may also include a first actuator configured to contact a first lobe of the first cam, a second actuator configured to contact a second lobe of the first cam, a third actuator configured to contact a third lobe of the second cam, and a fourth actuator configured to contact a fourth lobe of the second cam. The robotic joint may also include a first coupling link configured to couple the first cam to a first drive shaft link, wherein a first end of the first coupling link is coupled to a first spherical bearing positioned on the first cam, and wherein a second end of the first coupling link is coupled to a second spherical bearing positioned on the first drive shaft link. The robotic joint may also include a second coupling link configured to couple the second cam to a second drive shaft link, wherein a first end of the second coupling link is coupled to a third spherical bearing positioned on the second cam, and wherein a second end of the second coupling link is coupled to a fourth spherical bearing positioned on the second drive shaft link. The robotic joint may also include a drive shaft rigidly coupled to the first drive shaft link and the second drive shaft link. The drive shaft may be configured to rotate about a first pivot axis when the first and third actuators and the second and fourth actuators act in concert. The drive shaft may configured to rotate about a second pivot axis when the first and fourth actuators and the second and third actuators act in concert. The second pivot axis may be orthogonal to the first pivot axis.

In still other examples, methods and computer program products including instructions executable by a device, or by one or more processors or other components of the device, to perform functions of the methods are provided. The methods may be executable for operating a robotic device, for example.

These as well as other aspects, advantages, and alternatives, will become apparent to those of ordinary skill in the art by reading the following detailed description, with reference where appropriate to the accompanying figures.

DETAILED DESCRIPTION

Figure 1:
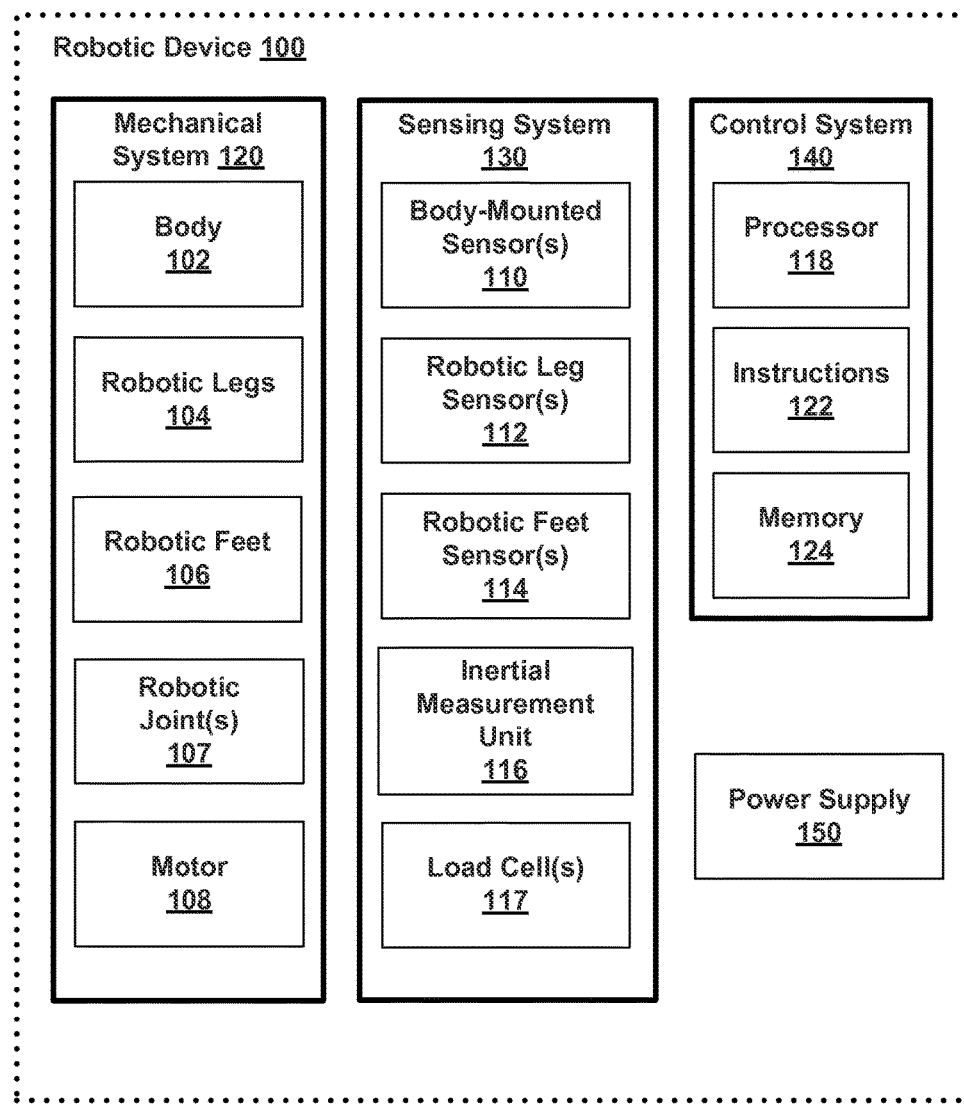
FIG. 1 is a functional block diagram illustrating a robotic device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Robotic devices may include several joints configured to enable. In robotic device to perform a variety of functions and movements. For example, a robotic device nay include hip joints, ankle joints, and/or wrist joints. In some example operations, such joints of a robotic device may need a large range of motion and consistent transmission ratio in a first degree of freedom to perform desired functions. Such joints may further require operation in a second degree of freedom. Example linkages for use in a joint of a robotic device are described herein to accomplish such goals.

An example robotic joint may include a first cam and a second cam. The robotic joint may also include a first actuator configured to contact the first cam, a second actuator configured to contact the first cam, a third actuator configured to contact the second cam, and a fourth actuator configured to contact the second cam. The robotic joint may also include a first coupling link configured to couple the first cam to a first drive shaft link, and a second coupling link configured to couple the second cam to a second drive shaft link. The robotic joint may also include a drive shaft rigidly coupled to the first drive shaft link and the second drive shaft link. When the first actuator and the third actuator extend towards the first and second cams, the first and second cams are moved into a first position. Similarly, when the second actuator and the fourth actuator extend towards the first and second cams, the first and second cams are moved into a second position. As such, the first and third actuators and the second and fourth actuators act in concert. The transition from the first position to the second position causes the drive shaft to rotate about a first pivot axis. The cams transmit the linear input from the actuators to a rotational output of the drive shaft.

Such a configuration enables the robotic joint to have a relatively large range of motion in a first degree of freedom. Further, the transmission ratio is relatively consistent across the motion of the joint, meaning a similar input at any joint angle results in a similar output. A consistent transmission ratio enables the actuators to be sized reasonably for a particular use case. In addition, the axis of rotation of the joint may be in line with the center line of the drive shaft.

Further, the robotic joint may operate such that the drive shaft rotates about a second pivot axis to obtain a second degree of freedom. In such a configuration, when the first actuator extends towards the first cam, the fourth actuator extends towards the second cam. Similarly, when the second actuator extends towards the first cam, the third actuator extends towards the second cam. Each of the cams may include a spherical bearing coupled to a first end of a coupling rod. A second end of the coupling rod may be further coupled to a driveshaft link via a second spherical bearing. As such, the coupling rod may transfer the input from the cams to a rotation in a second degree of freedom. The robotic joint may transition from the first degree of freedom movement to the second degree of freedom movement, depending on a particular use case for a robotic device.

It should be understood that the above examples are provided for illustrative purposes, and should not be construed as limiting. As such, the method may additionally or alternatively includes other features or includes fewer features, without departing from the scope of the invention.

Referring now to the figures, FIG. 1 illustrates a functional block diagram illustrating a robotic device 100, according to an example embodiment. The robotic device 100 may include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIG. 1.

The mechanical system 120 may include several components, including a body 102, one or more robotic legs 104, and one or more robotic feet 106 coupled to the one or more robotic legs 104. The mechanical system 120 may also include one or more robotic joints 107, configured to enable the robotic device to perform a variety of functions and movements, as discussed in more detail below. The mechanical system 120 may additionally include a motor 108, which may be an electric motor powered by electrical power, or may be powered by a number of different energy sources, such as a gas-based fuel or solar power. Additionally, motor 108 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may determine information about the environment that can be used by control system 140 (e.g., a computing device running motion planning software). The control system 140 could be located on the robotic device 100 or could be in remote communication with the robotic device 100. In one particular example, the sensing system 130 may use one or more body-mounted sensors 110 attached to the body 102 of the robotic device 100, which may be 2D sensors and/or 3D depth sensors that sense information about the environment as the robotic device 100 moves. For example, the body-mounted sensors 110 may determine a distance between the body 102 of the robotic device 100 and the ground surface on which the robotic device 100 operates. In further examples, one or more robotic leg sensors 112 may be located on the robotic legs 104 of the robotic device 100. The robotic leg sensors 112 may be contact sensors configured to alert the robotic device when the robotic legs 104 are in contact with the ground surface. In another example, the robotic legs 104 may be coupled to robotic feet 106 that contact the ground surface. In such a case, the robotic device 100 may include one or more robotic feet sensors 114 positioned on the robotic feet 106 of the robotic device 100. The robotic feet sensors 114 may be contact sensors configured to alert the robotic device 100 when the robotic feet 106 are in contact with the ground surface.

The sensing system 130 may further include an inertial measurement unit (IMU) 116. In an illustrative embodiment, IMU 116 may include both an accelerometer and a gyroscope, which may be used together to determine the orientation, position, and/or velocity of the robotic device 100. In particular, the accelerometer can measure the orientation of the robotic device 100 with respect to gravity, while the gyroscope measures the rate of rotation around an axis. IMUs are commercially available in low-cost, low-power packages. For instance, an IMU 116 may take the form of or include a miniaturized MicroElectroMechanical System (MEMS) or a NanoElectroMechanical System (NEMS). Other types of IMUs may also be utilized. The IMU 116 may include other sensors, in addition to accelerometers and gyroscopes, which may help to better determine position and/or help to increase autonomy of the robotic device 100. Two examples of such sensors are magnetometers and pressure sensors. Other examples are also possible.

The sensing system may further include one or more load cells 117. Load cells 117 may be provided at all of the robotic joints 107 of the robotic device 100, or at selected joints such as an elbow joint, for example. Example load cells 117 may include a multi-axis load cell that includes strain gauges on multiple surfaces to sense forces along multiple axes. Urethane (or other rubber, plastic, epoxy material) may be included surrounding the load cell to enable an applied force to be sensed by the strain gauges.

An example load cell 117 may be internal to an actuator of the robotic joint 107 and coupled between the actuator 102 and the robotic joint 107, provided on the actuator, or provided on the robotic joint 107. The load cell 117 may further be a component internal of the robotic joint 107. The load cell 117 may include a transducer to detect and convert an applied force to the robotic manipulator into an electrical signal. For example, a force being sensed deforms a strain gauge of the load cell 117, and the strain gauge measures the deformation (strain) as an electrical signal because the strain changes an effective electrical resistance of the gauge. The load cell 116 may include four strain gauges in a Wheatstone bridge configuration, one strain gauge in a quarter-bridge configuration, or two strain gauges in a half-bridge configuration. The electrical signal output may be in the order of a few millivolts and may be amplified as well.

Many or all of the functions of the robotic device 100 could be controlled by control system 140. Control system 140 may include at least one processor 118 (which could include at least one microprocessor) that executes instructions 122 stored in a non-transitory computer readable medium, such as the memory 124. The control system 140 may also represent a plurality of computing devices that may serve to control individual components or subsystems of the robotic device 100 in a distributed fashion.

In some embodiments, memory 124 may contain instructions 122 (e.g., program logic) executable by the processor 118 to execute various functions of robotic device 100, including those described below. Memory 124 may contain additional instructions as well, including instructions to transmit data to, receive data from, interact with, and/or control one or more of the mechanical system 120, the sensor system 130, and/or the control systems 140.

Figure 2A:
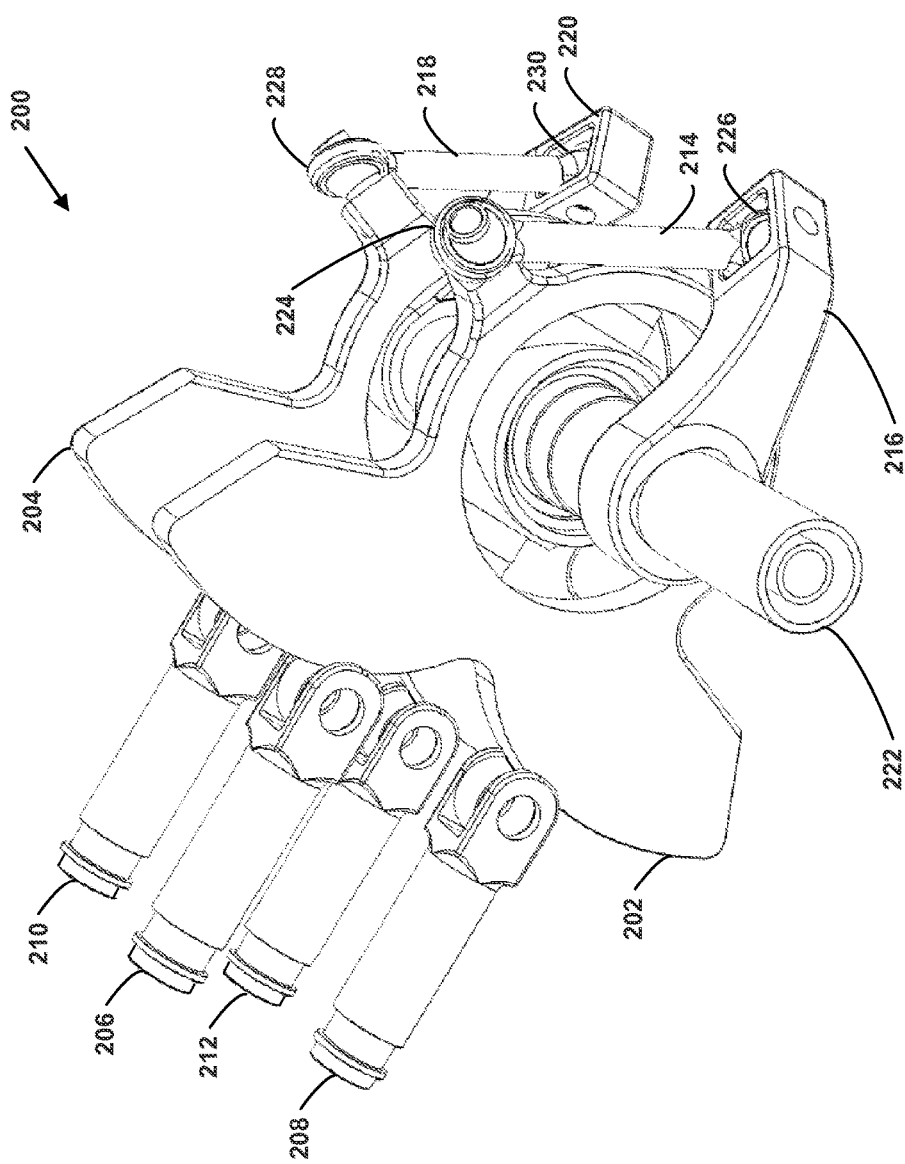
FIG. 2A illustrates an example robotic joint, in accordance with at least some embodiments described herein.

As described above, robotic devices may include several joints configured to enable the robotic device to perform a variety of functions and movements. For example, a humanoid robotic device may include hip joints, ankle joints, and/or wrist joints. FIG. 2A illustrates an example robotic joint 200, according to an example embodiment. As shown in FIG. 2A, the robotic joint 200 may include a first cam 202 and a second cam 204. The first cam 202 may be positioned substantially parallel to the second cam 204. The robotic joint 200 may also include a first actuator 206 configured to contact a first lobe of the first cam 202, and a second actuator 208 configured to contact a second lobe of the first cam 202. Similarly, the robotic joint 200 may include a third actuator 210 configured to contact a third lobe of the second cam 204, and a fourth actuator 212 configured to contact a fourth lobe of the second cam 204.

The robotic joint 200 may further include a first coupling link 214 configured to couple the first cam 202 to a first drive shaft link 216. Similarly, the robotic joint 200 may also include a second coupling link 218 configured to couple the second cam 204 to a second drive shaft link 220. Further, the robotic joint 200 may include a drive shaft 222 coupled to the first drive shaft link 216 and the second drive shaft link 220. The drive shaft 222 may be rigidly coupled to the drive shaft links 216, 220 such that a rotation of the drive shaft links 216, 220 is transferred to a rotation of the drive shaft 222. In one example, the drive shaft links 216, 220 may include holes through which the drive shaft 222 may be press fit. In another example, the drive shaft 222 may include threads that screw into complementary threads of the drive shaft links 216, 220. Other examples are possible as well.

As FIG. 2A further illustrates, a first end of the first coupling link 214 may be coupled to a first spherical bearing 224 positioned on the first cam 202, and a second end of the first coupling link 214 may be coupled to a second spherical bearing 226 positioned on the first drive shaft link 216. Similarly, a first end of the second coupling link 218 may be coupled to a third spherical bearing 228 positioned on the second cam 204, and a second end of the second coupling link 218 may be coupled to a fourth spherical bearing 230 positioned on the second drive shaft link 220. In another embodiment, the spherical bearings 224, 226, 228, 230 may be replaced by revolute joints to permit angular rotation. Other embodiments are possible as well.

Figure 2B:
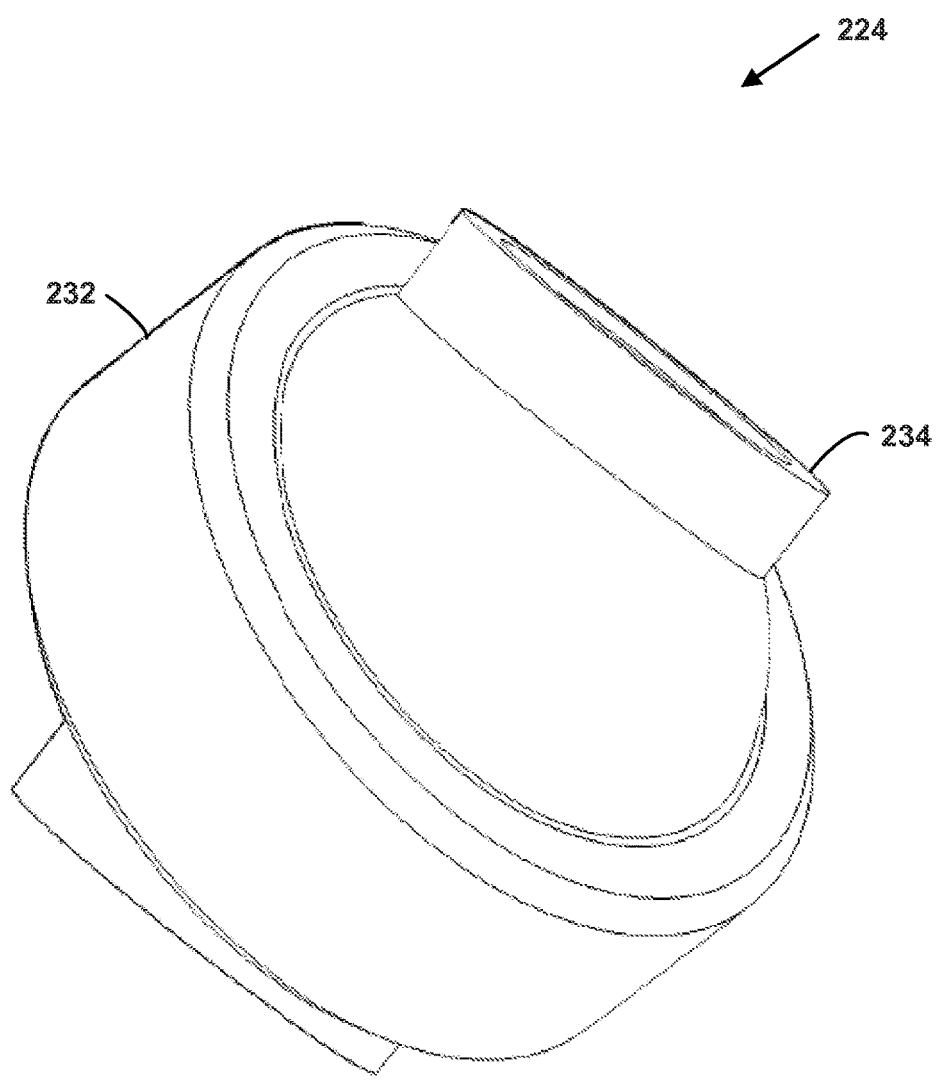
FIG. 2B illustrates an example spherical bearing, in accordance with at least some embodiments described herein.

The spherical bearings 224, 226, 228, 230 may permit angular rotation about a central point in two orthogonal directions. As shown in FIG. 2B, an example spherical bearing 224 may include an outer ring 232 and an inner component 234. The spherical bearing may further include a locking feature that makes the inner component 234 captive within the outer ring 232 in the axial direction only. An outer surface of the inner component 234 and an inner surface of the outer ring 232 slide against one another such that the outer ring 232 may move rotationally with respect to the inner component 234, as well as at an angle with respect to the inner component 234. Thus, in operation the inner component 234 may be secured such that it does not rotate, while the outer ring 232 rotates with respect to the inner component 234. The spherical bearing 224 may include a lubricant positioned between the outer ring 232 and the inner component 234, or a rolling element such as ball-bearings may be positioned between the outer ring 232 and the inner component 234 to minimize friction. Although FIG. 2B references the first spherical bearing 234, the other spherical bearings 226, 228, and 230 may be similarly configured.

Figure 2C:
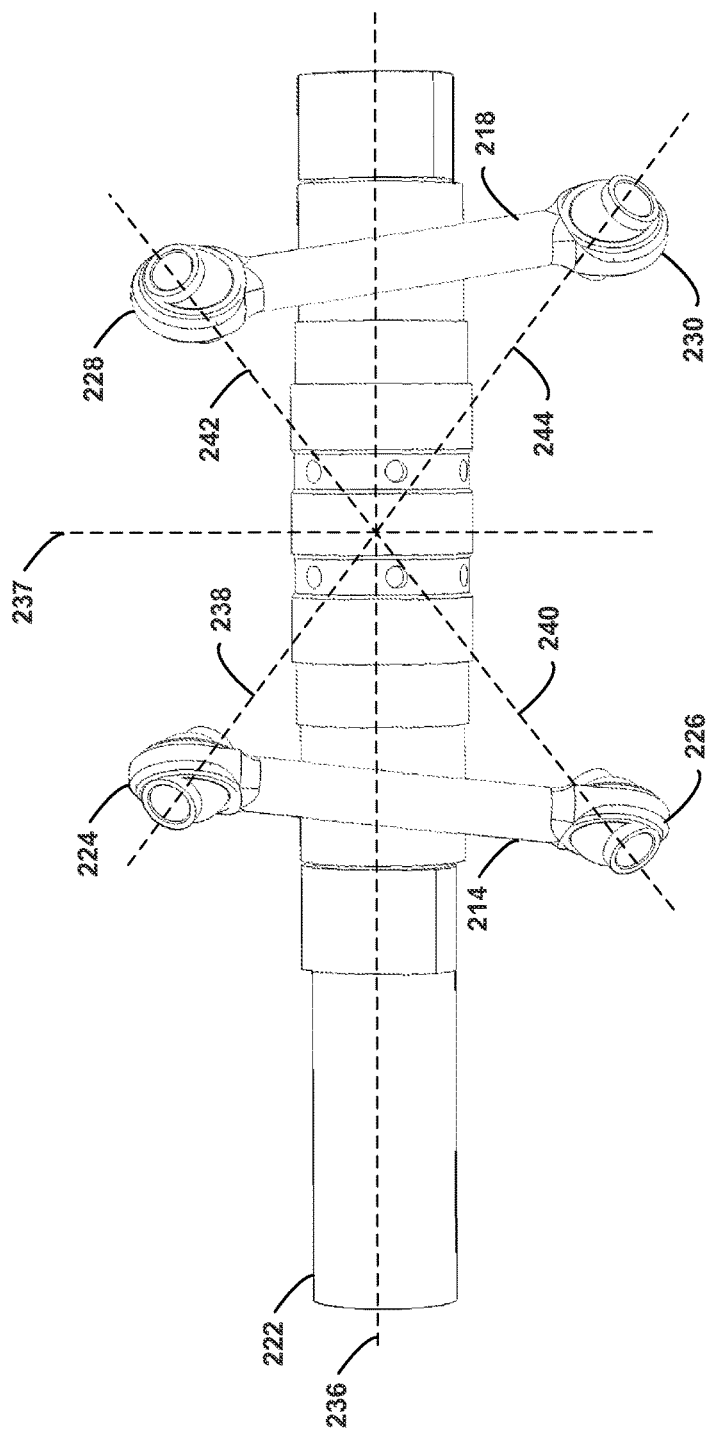
FIG. 2C illustrates a particular configuration of the example robotic joint, in accordance with at least some embodiments described herein.

FIG. 2C illustrates a particular configuration of the spherical bearings 224, 226, 228, 230 with respect to the drive shaft 222, according to an example embodiment. The robotic joint has a first pivot axis 236 and a second pivot axis 237, as discussed in more detail in relation to FIG. 2H. As shown in FIG. 2C, the first pivot axis 236 may be positioned along a centerline of the drive shaft 222. Similarly, the first spherical bearing 224 has a centerline 238 that passes through the center of the inner component of the first spherical bearing 224, the second spherical bearing 226 has a centerline 240 that passes through the center of the inner component of the second spherical bearing 226, the third spherical bearing 228 has a centerline 242 that passes through the center of the inner component of the third spherical bearing 228, and the fourth spherical bearing 230 has a centerline 244 that passes through the center of the inner component of the fourth spherical bearing 230. The spherical bearings 224, 226, 228, 230 may be arranged such that the centerlines 238, 240, 242, 244 of the spherical bearings 224, 226, 228, 230 intersect at a common point at the intersection of the first pivot axis 236 and the second pivot axis 237 at a midpoint between the first cam 202 and the second cam 204. Such a configuration results in no relative motion of the spherical bearings 224, 226, 228, 230 as the drive shaft 222 rotates.

Figure 2D:
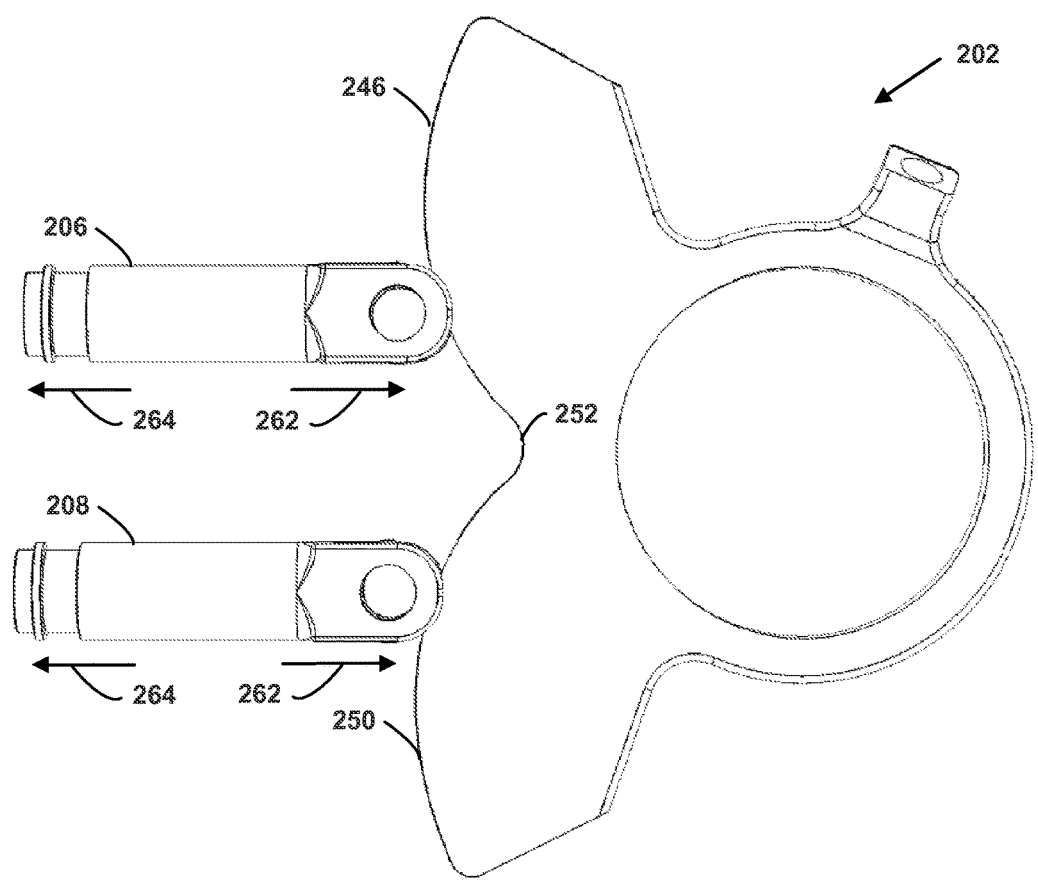
FIG. 2D illustrates an example cam, in accordance with at least some embodiments described herein.

FIG. 2D illustrates an example first cam 202, according to an example embodiment. Although FIG. 2D only references the first cam 202, the first actuator 206, and the second actuator 208, the second cam 204, the third actuator 210 and the fourth actuator 212 may be similarly configured. The first cam 202 may include a first lobe 246 a second lobe 250. The first lobe 246 and the second lobe 250 define a curved surface including a depression 252 between the first lobe 246 and the second lobe 250. As described above, the first actuator 206 may be configured to contact the first lobe 246 of the first cam 202, and the second actuator 208 may be configured to contact the second lobe 250 of the first cam 202.

Figure 2E:
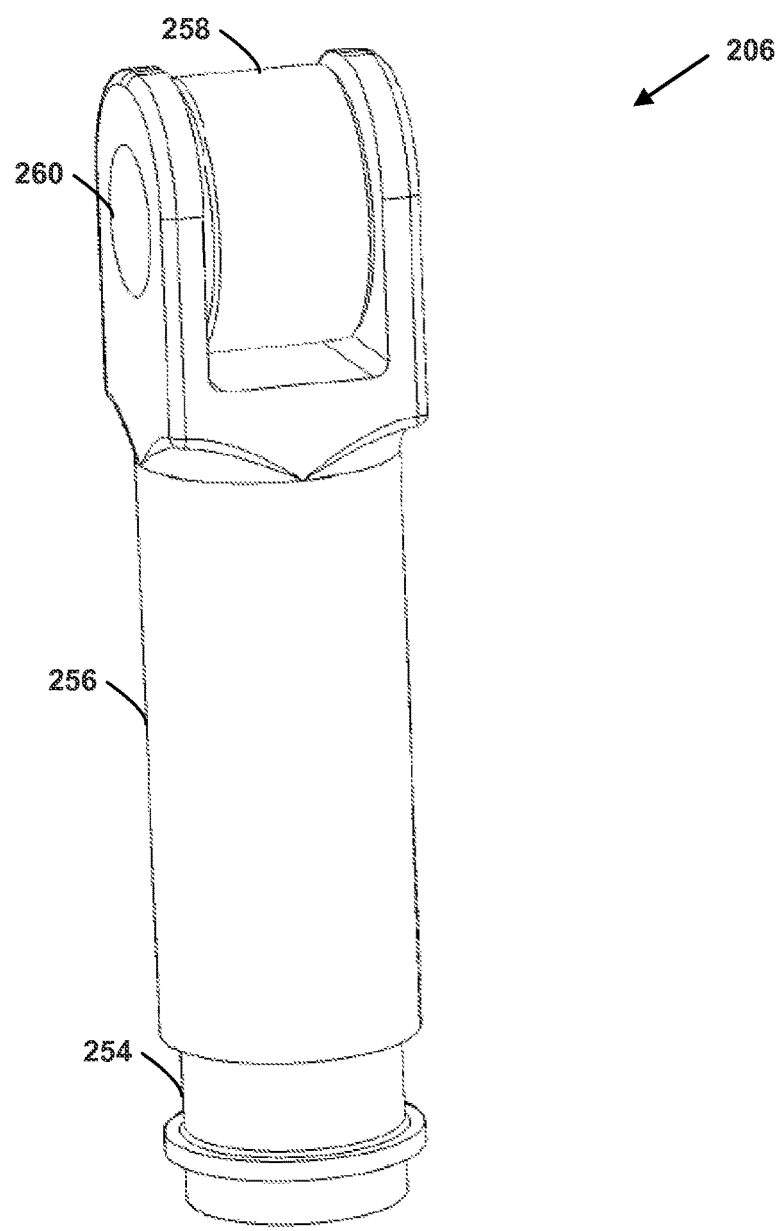
FIG. 2E illustrates an example actuator, in accordance with at least some embodiments described herein.

FIG. 2E illustrates an example first actuator 206, according to an example embodiment. As shown in FIG. 2E, the first actuator 206 may include a piston 254 positioned inside of a rod 256. An end of the rod 256 may include a roller 258 that is coupled to the rod 256 via a pin joint 260. The roller 258 may be configured to contact the first lobe 246 of the first cam 202. Although FIG. 2E references the first actuator 206, the other actuators 208, 210, and 212 may be similarly configured.

Referring back to FIG. 2D, the first actuator 206 may include a piston that is configured to move in a thrusting direction 262 and a relaxing direction 264. Similarly, the second actuator 208 may include a piston that is configured to move in a thrusting direction 262 and a relaxing direction 264. As such, the first actuator 206 and the second actuator 208 each have a thrusting mode and a relaxing mode. The thrusting mode is a configuration where force is applied to the rod of the actuator in the thrusting direction 262. The relaxing mode is a configuration where the rod is not impeded from motion in either the thrusting direction 262 or the relaxing direction 264.

In one example, the actuators 206, 208 are activated by hydraulic pressure, such that when an actuator is configured in the thrusting mode, pressurized hydraulic fluid is applied in a chamber behind the corresponding piston of the actuator. When an actuator is configured to be in the relaxing mode, hydraulic fluid is allowed to flow at least unimpeded (and optionally assisted by suction) out of the chamber. Similar principles apply if the actuators are powered by pneumatics, solenoids or other power sources.

Typically, when the first actuator 206 is configured to be in the thrusting mode, the rod of the first actuator 206 moves in the thrusting direction 262 while at the same time the second actuator 208 is configured to be in the relaxing mode and the rod of the second actuator 208 moves in the relaxing direction 264. Typically, when the second actuator 208 is configured to be in the thrusting mode, the rod of the second actuator 208 moves in the thrusting direction 262 while at the same time the first actuator 206 is configured to be in the relaxing mode and the rod of the first actuator 206 moves in the relaxing direction 264.

The first actuator 206 and the second actuator 208 described above in relation to FIGS. 2A and 2D may be coupled to a hydraulic circuit to assist in various actions. In one example, the hydraulic circuit may be intended to assist in walking. In this example, an example robotic device (such as robotic device 100 in relation to FIG. 1) may include position sensors and pressure sensors to provide joint position and torque data to a controller (e.g., a microprocessor, FPGA, microcontroller, or the like). Based on these inputs and knowledge of typical walking gait cycles, the controller may be programmed to open and close valves in the actuators at various phases of the gait cycle.

Other hydraulic circuits are possible and can be tailored for other behaviors, such as walking downhill, stair descent, etc. Circuits may also be designed to store energy on descent and use this energy for assisting ascent. Auxiliary power sources such as electric motors or fuel-driven engines can be used to enable sustained climbing, jumping etc. Other sensors such as foot force sensors, accelerometers, electromyography sensors, nerve implants, brain implants, etc. may be used as inputs to a controller which can modulate the force in actuators thus modulating the torque applied by the robotic joint 200.

In operation, the robotic joint 200 may begin with the actuators 206, 208, 210, 212 in a neutral position, as shown in FIG. 2A. The first actuator 206 may then be configured to enter a first thrusting mode, and at the same time the third actuator 210 may be configured to enter a third thrusting mode. The first actuator 206 and the third actuator 210 may be said to act in concert in such a configuration. When the first actuator 206 and the third actuator 210 are in their respective thrusting modes, the second actuator 208 may be configured to enter a second relaxing mode and the fourth actuator 212 may be configured to enter a fourth relaxing mode. The second actuator 208 and the fourth actuator 212 may be said to act in concert in such a configuration.

Figure 2F:
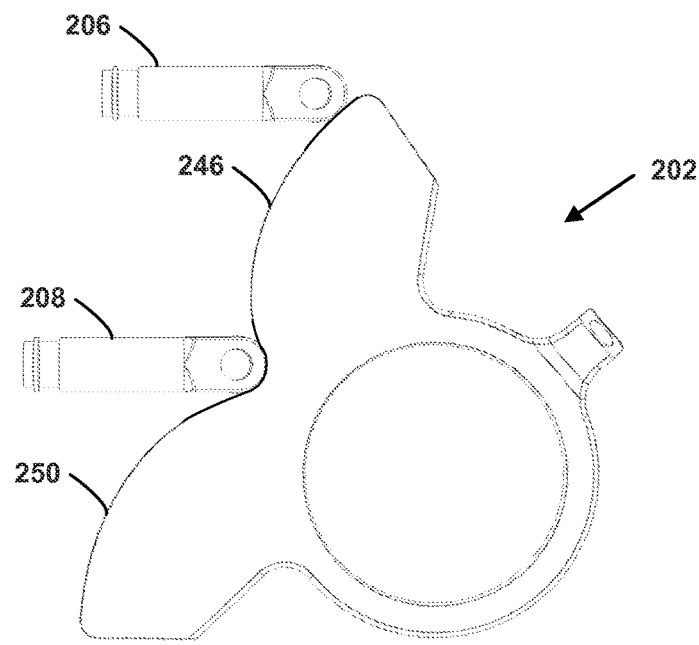
FIGS. 2F-2G illustrate an example operation of the robotic joint, in accordance with at least some embodiments described herein.
Figure 2G:
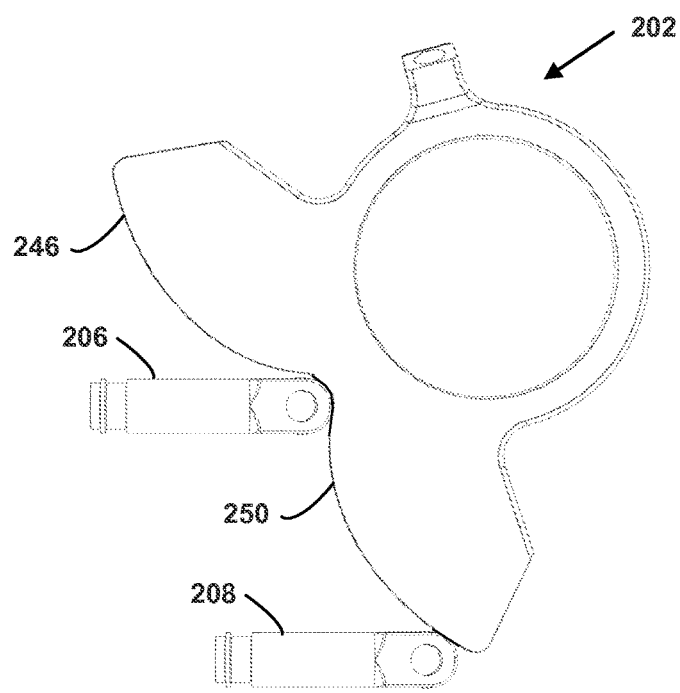
Figure 2H:
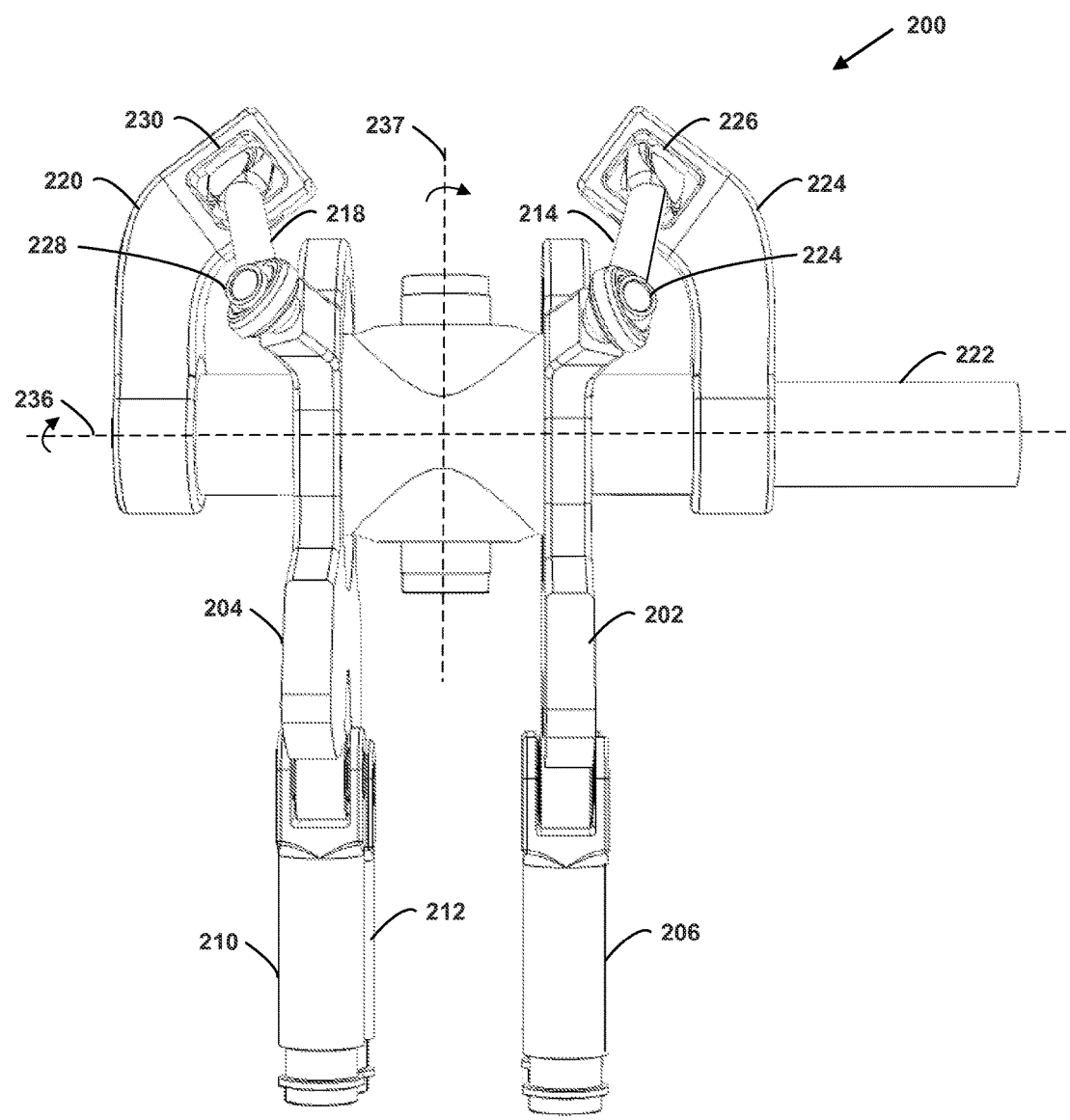
FIG. 2H illustrates a top view of the example robotic joint, in accordance with at least some embodiments described herein.

As the first actuator 206 extends in the first thrusting mode, as shown in FIG. 2F, the first actuator 206 moves along the first lobe 246 of the first cam 202. Similarly, as the third actuator 210 extends in the third thrusting mode, the third actuator 210 moves along the third lobe of the second cam 204. This movement causes the first cam 202 and the second cam 204 to rotate about a first pivot axis 236, as shown in FIG. 2H. The coupling links 214, 218 transfer this rotational motion of the cams 202, 204 to a torque on the drive shaft 222 via the drive shaft links 220, 224. Thus, when the first actuator 206 and the third actuator 210 and the second actuator 208 and the fourth actuator 212 act in concert, the drive shaft 222 rotates about the first pivot axis 236.

Once the first actuator 206 and the third actuator 210 are fully extended, the first actuator 206 may be configured to enter a first relaxing mode and the third actuator 210 may be configured to enter a third relaxing mode. At the same time, the second actuator 208 may be configured to enter a second thrusting mode, and the fourth actuator 212 may be configured to enter a fourth thrusting mode. As the second actuator 208 extends in the second thrusting mode, as shown in FIG. 2G, the second actuator 208 moves along the second lobe 250 of the first cam 202. Similarly, as the fourth actuator 212 extends in the fourth thrusting mode, the fourth actuator 212 moves along the fourth lobe of the second cam 204. This movement causes the first cam 202 and the second cam 204 to rotate about a first pivot axis 236 in an opposite direction than when the first actuator 206 and the third actuator 210 are in their respective thrusting modes. As discussed above, the coupling links 214, 218 transfer this rotational motion of the cams 202, 204 to a torque on the drive shaft 222 via the drive shaft links 220, 224.

Such a configuration enables the robotic joint 200 to have a relatively large range of motion in a first degree of freedom. Further, the transmission ratio is relatively consistent across the motion of the robotic joint 200, meaning a similar input at any joint angle results in a similar output. A consistent transmission ratio enables the actuators 206, 208, 210, 212 to be sized reasonably for a particular use case. In addition, the first pivot axis 236 of may be in line with the center line of the drive shaft 222.

In addition, the shape of the curved surface of the first cam 202 causes the extension distance of the first actuator 206 to be equal to the retraction distance of the second actuator 208, and vice versa. Similarly, the shape of the curved surface of the second cam 204 causes the extension distance of the third actuator 210 to be equal to the retraction distance of the fourth actuator 212, and vice versa. In such a configuration, if the pistons of the actuators are the same size, a hydraulic system may be configured to simultaneously extract the same amount of hydraulic fluid from one actuator as is being injected into the other actuator. Furthermore, if in this configuration the hydraulic lines between the first and second actuators (206 and 208) are interconnected so that the pressure is substantially equalized on both pistons, the net torque is zero and the first cam 202 rotates substantially freely (with only friction-like forces affecting the movement). A similar configuration may be possible for the third and fourth actuators (210 and 212).

An additional advantage is that the actuators 206, 208, 210, 212 do not need to pivot, which eliminates the need for potentially unreliable flexible tubing or rotary unions to carry fluid to the cylinder and reduces space requirements. Further, since the robotic joint includes antagonistic actuators, any mechanical backlash in the system is automatically removed.

In another embodiment, the robotic joint 200 may operate such that the drive shaft 222 rotates about a second pivot axis 237 to obtain a second degree of freedom. The second pivot axis 237 may be orthogonal to the first pivot axis 236. In such a configuration, when the first actuator 206 extends towards the first cam 202, the fourth actuator 212 may simultaneously extend towards the second cam 204. In other words, the first actuator 206 and the fourth actuator 212 may act in concert such that the first actuator 206 is in the first thrusting mode when the fourth actuator 212 is in the fourth thrusting mode. Similarly, when the second actuator 208 extends towards the first cam 202, the third actuator 210 may simultaneously extend towards the second cam 204. In other words, the second actuator 208 and the third actuator 210 may act in concert such that the second actuator 208 is in the second thrusting mode when the third actuator 210 is in the third thrusting mode. Similar to the configuration described above, the first and second actuators (206 and 208) are always in opposite modes of operation. Similarly, the third and fourth actuators (210 and 212) are always in opposite modes of operation.

As the first actuator 206 extends in the first thrusting mode, as shown in FIG. 2F, the first actuator 206 moves along the first lobe 246 of the first cam 202. Similarly, as the fourth actuator 212 extends in the fourth thrusting mode, the fourth actuator 212 moves along the fourth lobe of the second cam 204. Such a configuration is illustrated in FIG. 2G. This movement causes the first cam 202 and the second cam 204 to rotate in opposite directions. The coupling links 214, 218 transfer this rotational twisting motion of the cams 202, 204 to a torque on the drive shaft 222 via the drive shaft links 220, 224. Thus, when the first actuator 206 and the fourth actuator 212 and the second actuator 208 and the third actuator 210 act in concert, the drive shaft 222 rotates about the second pivot axis 266.

The robotic joint 200 may transition from the first degree of freedom movement to the second degree of freedom movement, depending on a particular use case for a robotic device. The drive shaft 222 may be coupled to various components of a robotic device to further transfer the rotational motion to perform desired tasks or functions. For example, the robotic joint 200 may be used as an ankle joint for a humanoid robotic device. In such an example, the robotic device may cause the first and third actuators (206 and 210) and the second and fourth actuators (208 and 212) to act in concert to cause the robotic joint 200 to perform dorsiflexion and plantar flexion movement of the ankle joint. Further, the robotic device may cause the first and fourth actuators (206 and 212) and the second and third actuators (208 and 210) to act in concert to cause the robotic joint to perform inversion and eversion of the ankle joint. Other examples are possible as well.

As discussed above, an example robotic device may further include a load cell provide proximal to the robotic joint 200. The load cell may be configured to detect a force applied to the robotic device and the torque applied to the drive shaft 222. The robotic device may further include a controller programmable to determine a location of the detected force based on values of the force and the torque output from the load cell. The controller may responsively cause the actuators to adjust the torque applied to the drive shaft 222 based on the determined value and location of the detected force.

Figure 3:
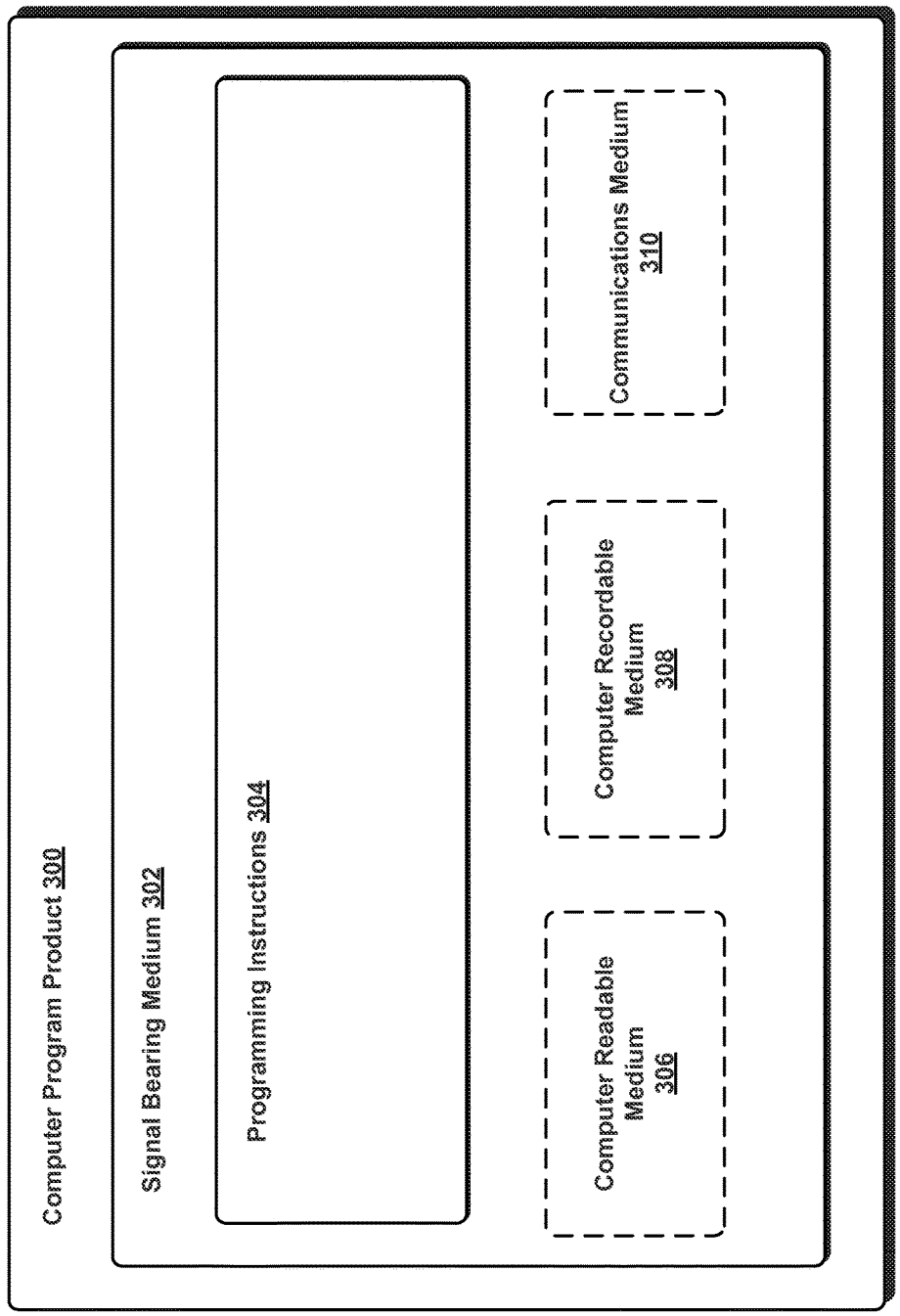
FIG. 3 depicts a computer-readable medium configured according to an example embodiment.

FIG. 3 illustrates a computer-readable medium configured according to an example embodiment. In example embodiments, the example robotic device can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed robotic joints can perform actions that may be implemented by computer program instructions encoded on a non-transitory computer-readable storage media in a machine-readable format, or on other non-transitory media or articles of manufacture. FIG. 3 is a schematic illustrating a conceptual partial view of an example computer program product that includes a computer program for executing a computer process on a computing device, arranged according to at least some embodiments presented herein.

In one embodiment, the example computer program product 300 is provided using a signal bearing medium 302. The signal bearing medium 302 may include one or more programming instructions 304 that, when executed by one or more processors may provide functionality or portions of the functionality described above with respect to FIGS. 1-2H. In some examples, the signal bearing medium 302 can be a computer-readable medium 306, such as, but not limited to, a hard disk drive, a Compact Disc (CD), a Digital Video Disk (DVD), a digital tape, memory, etc. In some implementations, the signal bearing medium 302 can be a computer recordable medium 308, such as, but not limited to, memory, read/write (R/W) CDs, R/W DVDs, etc. In some implementations, the signal bearing medium 302 can be a communications medium 310, such as, but not limited to, a digital and/or an analog communication medium (e.g., a fiber optic cable, a waveguide, a wired communications link, a wireless communication link, etc.). Thus, for example, the signal bearing medium 302 can be conveyed by a wireless form of the communications medium 310.

The one or more programming instructions 304 can be, for example, computer executable and/or logic implemented instructions. In some examples, a computing device such as the processor 118 of FIG. 1 is configured to provide various operations, functions, or actions in response to the programming instructions 304 conveyed to the processor 118 by one or more of the computer-readable medium 306, the computer recordable medium 308, and/or the communications medium 310.

The non-transitory computer-readable medium 308 could also be distributed among multiple data storage elements, which could be remotely located from each other. The device that executes some or all of the stored instructions could be a client-side computing device. Alternatively, the device that executes some or all of the stored instructions could be a server-side computing device.

Within some examples herein, operations may be described as methods for performing functions, and methods may be embodied on a computer program product (e.g., a tangible computer readable storage medium or non-transitory computer readable medium) that includes instructions executable to perform the functions.

Figure 4:
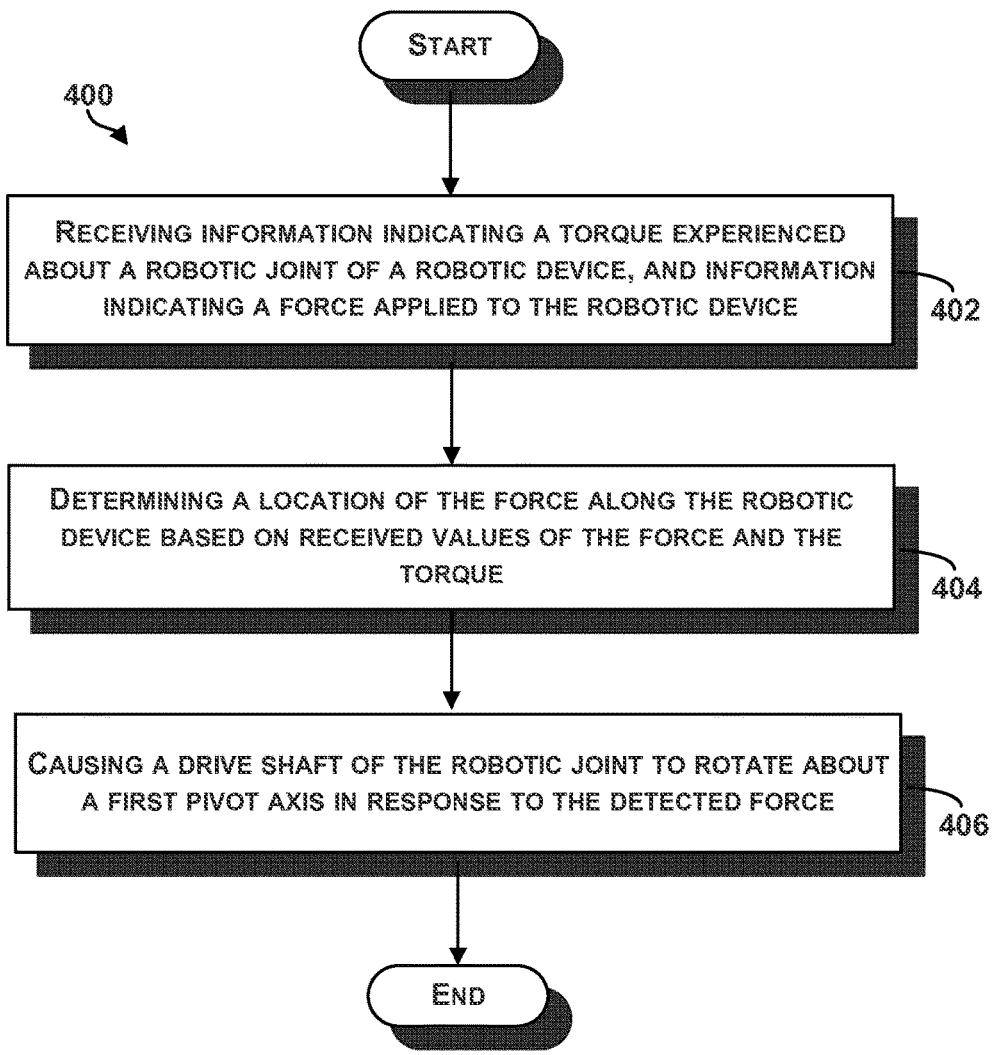
FIG. 4 is a flowchart illustrating an example method for operating a robotic device.

FIG. 4 is a flowchart illustrating an example method 400 for operating a robotic device. The method 400 may be embodied as computer executable instructions stored on non-transitory media, such as the configuration described above in relation to FIG. 3, for example. At block 402, the method 400 includes receiving information indicating a torque experienced about a robotic joint of a robotic device, and information indicating a force applied to the robotic device. The information may indicate values of the force and the torque along all three Cartesian coordinate axes X, Y, and Z. The information may be received from a load cell provided proximal to the robotic joint, for example. At block 404, the method 400 includes determining a location of the force along the robotic device based on received values of the force and the torque. The location of the force along the robotic device may be determined as a distance away from the load cell, for example.

At block 406, the method 400 includes causing a drive shaft of the robotic joint to rotate about a first pivot axis in response to the detected force. As discussed above, the first and third actuators and the second and fourth actuators act in concert when the drive shaft rotates about the first pivot axis. In another example, the method 400 may further include causing the drive shaft of the robotic joint to rotate about a second pivot axis in response to the load cell detecting a second force applied to the robotic device. As discussed above, the drive shaft rotates about the second pivot axis when the first and fourth actuators and the second and third actuators act in concert.

The robotic device 100 described in FIG. 1 and the robotic joints described in FIGS. 2A-2H above may be used in many implementations of the described method.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A robotic joint comprising:
a first cam;
a second cam positioned substantially parallel to the first cam;
a first actuator configured to contact a first lobe of the first cam, wherein the first actuator has a first thrusting mode and a first relaxing mode;
a second actuator configured to contact a second lobe of the first cam, wherein the second actuator has a second thrusting mode and a second relaxing mode;
a third actuator configured to contact a third lobe of the second cam, wherein the third actuator has a third thrusting mode and a third relaxing mode;
a fourth actuator configured to contact a fourth lobe of the second cam, wherein the fourth actuator has a fourth thrusting mode and a fourth relaxing mode;
a first coupling link configured to couple the first cam to a first drive shaft link;

a second coupling link configured to couple the second cam to a second drive shaft link;

a drive shaft rigidly coupled to the first drive shaft link and the second drive shaft link, wherein the drive shaft rotates about a first pivot axis and a second pivot axis such that the first pivot axis is orthogonal to the second pivot axis, wherein rotation about the first pivot axis occurs when the first and third actuators and the second and fourth actuators act in concert, such that the first actuator is in the first thrusting mode when the third actuator is in the third thrusting mode and the second actuator is in the second thrusting mode when the fourth actuator is in the fourth thrusting mode, and wherein rotation about the second pivot axis occurs when the first and fourth actuators and the second and third actuators act in concert, such that the first actuator is in the first thrusting mode when the fourth actuator is in the fourth thrusting mode and the second actuator is in the second thrusting mode when the third actuator is in the third thrusting mode.

2. The robotic joint of claim 1, wherein the first pivot axis is positioned along a centerline of the drive shaft.

3. The robotic joint of claim 1, wherein the first actuator, the second actuator, the third actuator, and the fourth actuator are hydraulic linear actuators.

4. The robotic joint of claim 1, further comprising:
a first spherical bearing coupled to the first cam, wherein a first end of the first coupling link is coupled to the first spherical bearing;
a second spherical bearing coupled to the first drive shaft link, wherein a second end of the first coupling link is coupled to the second spherical bearing;
a third spherical bearing coupled to the second cam, wherein a first end of the second coupling link is coupled to the third spherical bearing; and
a fourth spherical bearing coupled to the second drive shaft link, wherein a second end of the second coupling link is coupled to the fourth spherical bearing.

5. The robotic joint of claim 4, wherein a first centerline of the first spherical bearing, a second centerline of the second spherical bearing, a third centerline of the third spherical bearing and a fourth centerline of the fourth spherical bearing intersect at a common point at the intersection of the first pivot axis and the second pivot axis of the drive shaft at a midpoint between the first cam and the second cam.

6. The robotic joint of claim 1, further comprising:
a first revolute joint coupled to the first cam, wherein a first end of the first coupling link is coupled to the first revolute joint;
a second revolute joint coupled to the first drive shaft link, wherein a second end of the first coupling link is coupled to the second revolute joint;
a third revolute joint coupled to the second cam, wherein a first end of the second coupling link is coupled to the third revolute joint; and
a fourth revolute joint coupled to the second drive shaft link, wherein a second end of the second coupling link is coupled to the fourth revolute joint.

7. The robotic joint of claim 6, wherein a first centerline of the first revolute joint, a second centerline of the second revolute joint, a third centerline of the third revolute joint and a fourth centerline of the fourth revolute joint intersect at a common point at the intersection of the first pivot axis and the second pivot axis of the drive shaft at a midpoint between the first cam and the second cam.

8. The robotic joint of claim 1, wherein a transmission ratio of the robotic joint is constant when the first and third actuators and the second and fourth actuators act in concert.

9. The robotic joint of claim 1, wherein when the first actuator is in the first thrusting mode the second actuator is in the second relaxing mode, and wherein when the third actuator is in the third thrusting mode the fourth actuator is in the fourth relaxing mode.

10. The robotic joint of claim 1, wherein the robotic joint comprises one or more of a hip joint, an ankle joint, or a wrist joint of a humanoid robotic device.

11. A robotic device comprising:
a body;
one or more joints coupled to the body, wherein the one or more joints include:
a first cam;
a second cam positioned substantially parallel to the first cam;
a first actuator configured to contact a first lobe of the first cam;
a second actuator configured to contact a second lobe of the first cam;
a third actuator configured to contact a third lobe of the second cam;
a fourth actuator configured to contact a fourth lobe of the second cam;
a first coupling link configured to couple the first cam to a first drive shaft link;
a second coupling link configured to couple the second cam to a second drive shaft link; and
a drive shaft rigidly coupled to the first drive shaft link and the second drive shaft link;
a load cell provided proximal to a given joint of the one or more joints for detecting a first force applied to the robotic device; and
a controller coupled to the load cell for controlling the given joint to cause the drive shaft to rotate about a first pivot axis in response to the detected first force, such that the first and third actuators and the second and fourth actuators act in concert when the drive shaft rotates about the first pivot axis, wherein the controller is further configured to control the given joint to cause the drive shaft to rotate about a second pivot axis in response to the load cell detecting a second force applied to the robotic device, wherein the drive shaft rotates about the second pivot axis when the first and fourth actuators and the second and third actuators act in concert, and wherein the second pivot axis is orthogonal to the first pivot axis.

12. The robotic device of claim 11, wherein the first actuator, the second actuator, the third actuator, and the fourth actuator are hydraulic linear actuators.

13. The robotic device of claim 11, wherein the one or more joints further include:
a first spherical bearing coupled to the first cam, wherein a first end of the first coupling link is coupled to the first spherical bearing;
a second spherical bearing coupled to the first drive shaft link, wherein a second end of the first coupling link is coupled to the second spherical bearing;
a third spherical bearing coupled to the second cam, wherein a first end of the second coupling link is coupled to the third spherical bearing; and
a fourth spherical bearing coupled to the second drive shaft link, wherein a second end of the second coupling link is coupled to the fourth spherical bearing.

14. The robotic device of claim 13, wherein a first centerline of the first spherical bearing, a second centerline of the second spherical bearing, a third centerline of the third spherical bearing and a fourth centerline of the fourth spherical bearing intersect at a common point at the intersection of the first pivot axis and the second pivot axis of the drive shaft at a midpoint between the first cam and the second cam.

15. The robotic device of claim 11, wherein a transmission ratio of the given robotic joint is constant when the drive shaft rotates about the first pivot axis.

16. A robotic joint comprising:
a first cam;
a second cam positioned substantially parallel to the first cam;
a first actuator configured to contact a first lobe of the first cam;
a second actuator configured to contact a second lobe of the first cam;
a third actuator configured to contact a third lobe of the second cam;
a fourth actuator configured to contact a fourth lobe of the second cam;
a first coupling link configured to couple the first cam to a first drive shaft link, wherein a first end of the first coupling link is coupled to a first spherical bearing positioned on the first cam, and wherein a second end of the first coupling link is coupled to a second spherical bearing positioned on the first drive shaft link;
a second coupling link configured to couple the second cam to a second drive shaft link, wherein a first end of the second coupling link is coupled to a third spherical bearing positioned on the second cam, and wherein a second end of the second coupling link is coupled to a fourth spherical bearing positioned on the second drive shaft link; and a drive shaft rigidly coupled to the first drive shaft link and the second drive shaft link, wherein the drive shaft is configured to rotate about a first pivot axis when the first and third actuators and the second and fourth actuators act in concert, wherein the drive shaft is configured to rotate about a second pivot axis when the first and fourth actuators and the second and third actuators act in concert, and wherein the second pivot axis is orthogonal to the first pivot axis.

17. The robotic joint of claim 16, wherein a first centerline of the first spherical bearing, a second centerline of the second spherical bearing, a third centerline of the third spherical bearing and a fourth centerline of the fourth spherical bearing intersect at a common point at the intersection of the first pivot axis and the second pivot axis of the drive shaft at a midpoint between the first cam and the second cam.

18. The robotic joint of claim 16, wherein the first actuator, the second actuator, the third actuator, and the fourth actuator are hydraulic linear actuators.

19. The robotic joint of claim 16, wherein a transmission ratio of the given robotic joint is constant when the drive shaft rotates about the first pivot axis.

* * * * *